US008229947B2

(12) United States Patent (10) Patent No.: US 8,229,947 B2
Fujinaga (45) Date of Patent: Jul. 24, 2012

(54) IMAGE PROCESSING APPARATUS AND METHOD FOR CONTROLLING IMAGE PROCESSING APPARATUS

(75) Inventor: Seiya Fujinaga, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 377 days.

(21) Appl. No.: 12/049,076

(22) Filed: Mar. 14, 2008

(65) Prior Publication Data

US 2008/0243792 A1 Oct. 2, 2008

(30) Foreign Application Priority Data

Mar. 30, 2007 (JP) ................................. 2007-091032

(51) Int. Cl.
*G06F 17/30* (2006.01)
(52) U.S. Cl. ...................................................... 707/765
(58) Field of Classification Search .................. 707/758, 707/765
See application file for complete search history.

(56) References Cited

U.S. PATENT DOCUMENTS

| 5,379,420 | A* | 1/1995 | Ullner ................................. 1/1 |
| 7,580,568 | B1* | 8/2009 | Wang et al. .................... 382/173 |
| 2004/0148311 | A1* | 7/2004 | Sawada ........................ 707/102 |
| 2005/0097080 | A1* | 5/2005 | KethiReddy et al. ............. 707/3 |
| 2006/0074913 | A1* | 4/2006 | O'Sullivan et al. ............... 707/9 |

FOREIGN PATENT DOCUMENTS

| JP | 6-139244 A | 5/1994 |
| JP | 06-274543 A | 9/1994 |
| JP | 7-182320 A | 7/1995 |
| JP | 11-232008 A | 8/1999 |
| JP | 2001-126026 A | 5/2001 |
| JP | 2006-163841 A | 6/2006 |
| JP | 2006-185085 A | 7/2006 |

OTHER PUBLICATIONS

Shimizu Yutaka, Electronic Filing Device, Japanese Patent, Sep. 30, 1994, Japanese Patent Laid-Open No. 6-274543, Japan.
Sakae Kato, PDF Complete Guide, Nikkei PC 21, Oct. 1, 2004, pp. 30-33, vol. 9, No. 19, Nikkei Business Publications, Inc., Japan.
Hiroshi Yamaki, Adobe Acrobat 6.0 PDF Technical Manual for Windows, Manual, Nov. 11, 2003, First Edition, Acrobat 6.0 Portable Document Format, Iwao Kataoka, Gijutsu-Hyohron Co., Ltd., Japan.

* cited by examiner

*Primary Examiner* — James Trujillo
*Assistant Examiner* — William Spieler
(74) *Attorney, Agent, or Firm* — Canon USA, Inc., IP Division

(57) ABSTRACT

An apparatus includes a page designation unit configured to designate a page to be searched in a document file including a plurality of pages, an input unit configured to input a search key used to search the document file, and a search unit configured to perform character string search to search a keyword in the document file based on the search key. The search unit is capable of performing the character string search using a search key input by the input unit in a page of the document file designated by the page designation unit without performing the character string search in non-designated pages of the document file.

19 Claims, 16 Drawing Sheets

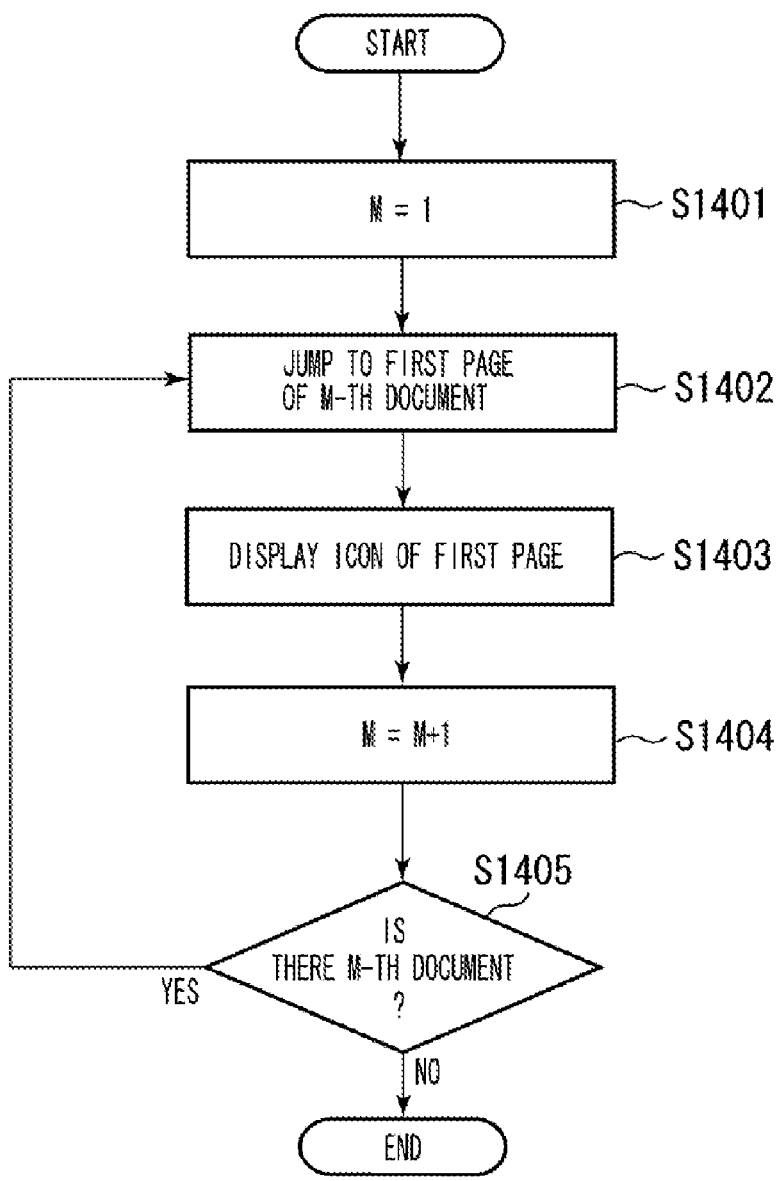

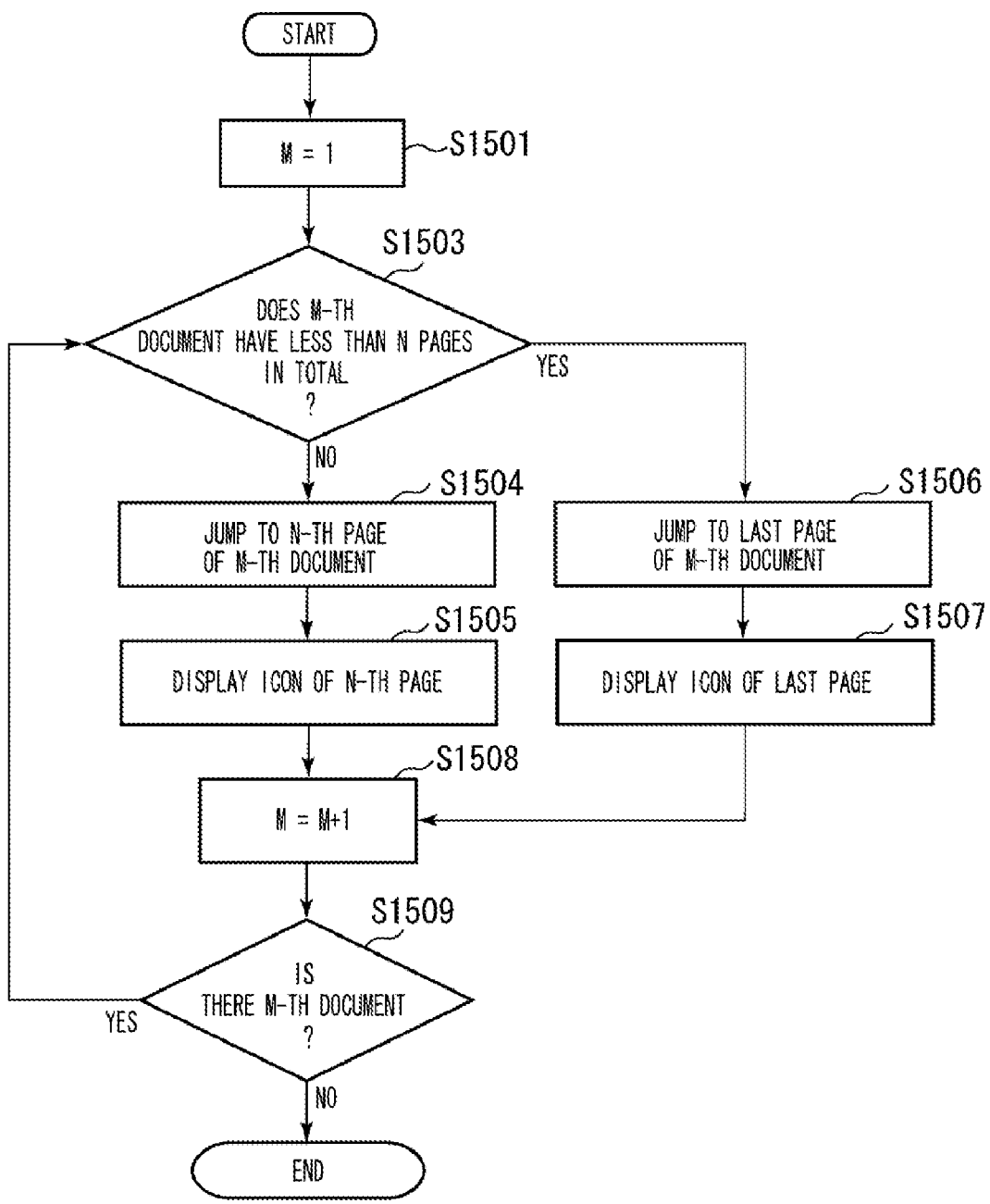

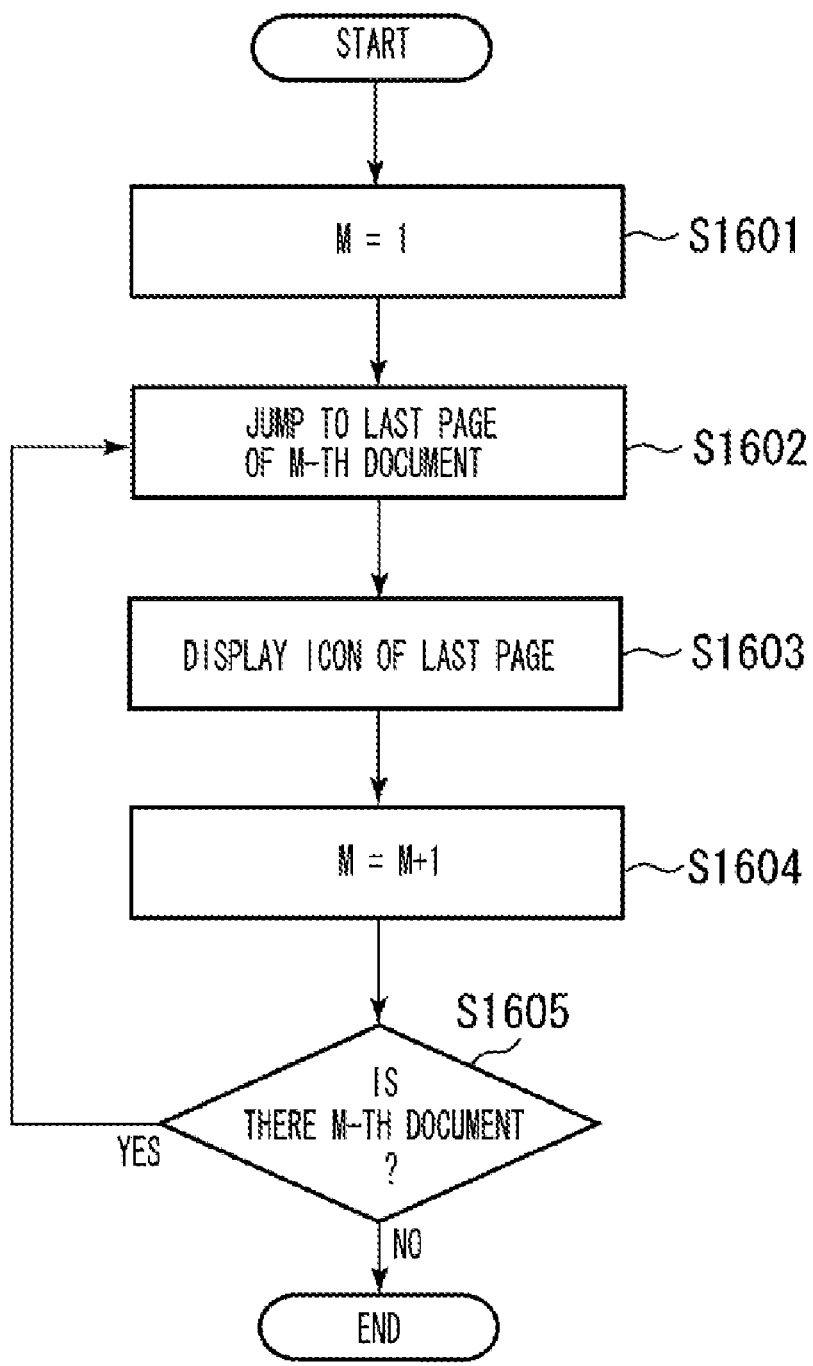

IMAGE PROCESSING APPARATUS AND METHOD FOR CONTROLLING IMAGE PROCESSING APPARATUS

BACKGROUND OF THE INVENTION

1. Field of the Invention

The present invention relates to an image processing apparatus having a document search function, and a method for controlling the image processing apparatus.

2. Description of the Related Art

In recent years, there has been widely used a method for managing text information in the form of data as well as in paper form along with development in computers and image filing apparatuses. Accordingly, document search technique is crucial and important especially for an apparatus that stores a large amount of document files storing document data each comprising a plurality of pages.

For example, if a document file is recorded in the form of text information such as a character code, the text information may be directly searched to find a target keyword. Alternatively, if the document file is recorded in the form of image information, a target keyword may be searched for through optical character recognition (OCR) or other such processes.

Conventional search techniques are typically performed based on search of all filed documents and thus they may take a long search time.

Under some particular circumstances, however, a user knows which page includes target information (for example, a third page) when searching a document file including a plurality of pages. In such cases, if the user could designate a specific page (for example, the third page) and search only the designated page of the document, processing time would be reduced. However, conventional search techniques do not allow a search that is performed only in a designated page.

As to the related art, the following techniques are known as a page-based document processing technique.

For example, Japanese Patent Application Laid-Open No. 11-232008 discuses a page flipping method that displays pages including a designated page. However, this method is inapplicable to search of a designated page in a plurality of document files.

In addition, Japanese Patent Application Laid-Open No. 6-139244 discusses a method of storing a displayed page to designate a printing area. This technique allows a user to know a printing area using the page being displayed, and the first page and last page of a target file. However, this technique is also unfavorable for increase of a search speed by searching for a keyword based on page information.

Further, Japanese Patent Application Laid-Open No. 7-182320 discusses a technique that allows a user to designate a plurality pages in a document and performs similar document processing (for example, document editing) on the designated pages. However, this technique does not give special consideration to keyword search and thus cannot be used to increase a search speed by carrying out the search in a designated page, either.

The document search is absolutely needed in an apparatus that stores a large amount of document files storing document data, especially, files of documents including a plurality of pages, and how to increase a search speed is an important problem for this kind of apparatus.

As described above, however, almost all of the conventional techniques cannot conduct effective search other than basic processing of a full text search. Thus, it is difficult to increase a search speed.

If it is known which page of plural documents includes target information, according to the conventional techniques, it is only possible to display a target page using an application, for example, a browser to search the information and then repeat this processing over the plurality of documents. Therefore, if many documents should be searched, this method may take longer processing time than full-text search.

SUMMARY OF THE INVENTION

An embodiment of the present invention is directed to a technique capable of searching a document with efficiency based on document page information through a simple operation.

According to an aspect of the present invention, an image processing apparatus includes: a page designation unit configured to designate a page to be searched in a document file including a plurality of pages; an input unit configured to input a search key used to search the document file; and a search unit configured to perform character string search to search a keyword in the document file based on the search key, wherein the search unit is capable of performing the character string search using a search key input by the input unit in a page of the document file designated by the page designation unit without performing the character string search in other pages of the document file that are not designated by the page designation unit.

According to an exemplary embodiment of the present invention, a character string search process is executed only on a page designated by a user. Hence, a document can be efficiently searched at high speed in a simple manner based on page information of a document file. In particular, search efficiency can be largely improved if a large amount of document file is stored.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a flowchart illustrating processing for displaying top pages of searched documents in list form.

FIG. 15 is a flowchart illustrating processing for displaying designated pages of searched documents in list form.

FIG. 16 is a flowchart illustrating processing for displaying last pages of searched documents in list form.

DETAILED DESCRIPTION OF THE EMBODIMENTS

Various exemplary embodiments, features, and aspects of the invention will be described in detail below with reference to the drawings.

Hereinafter, examples of an image processing apparatus according to an exemplary embodiment of the present invention will be described. The image processing apparatus is configured as a multifunction printing apparatus having an image printing function, an image scanning function, and an image communication function.

First Exemplary Embodiment

Figure 1:
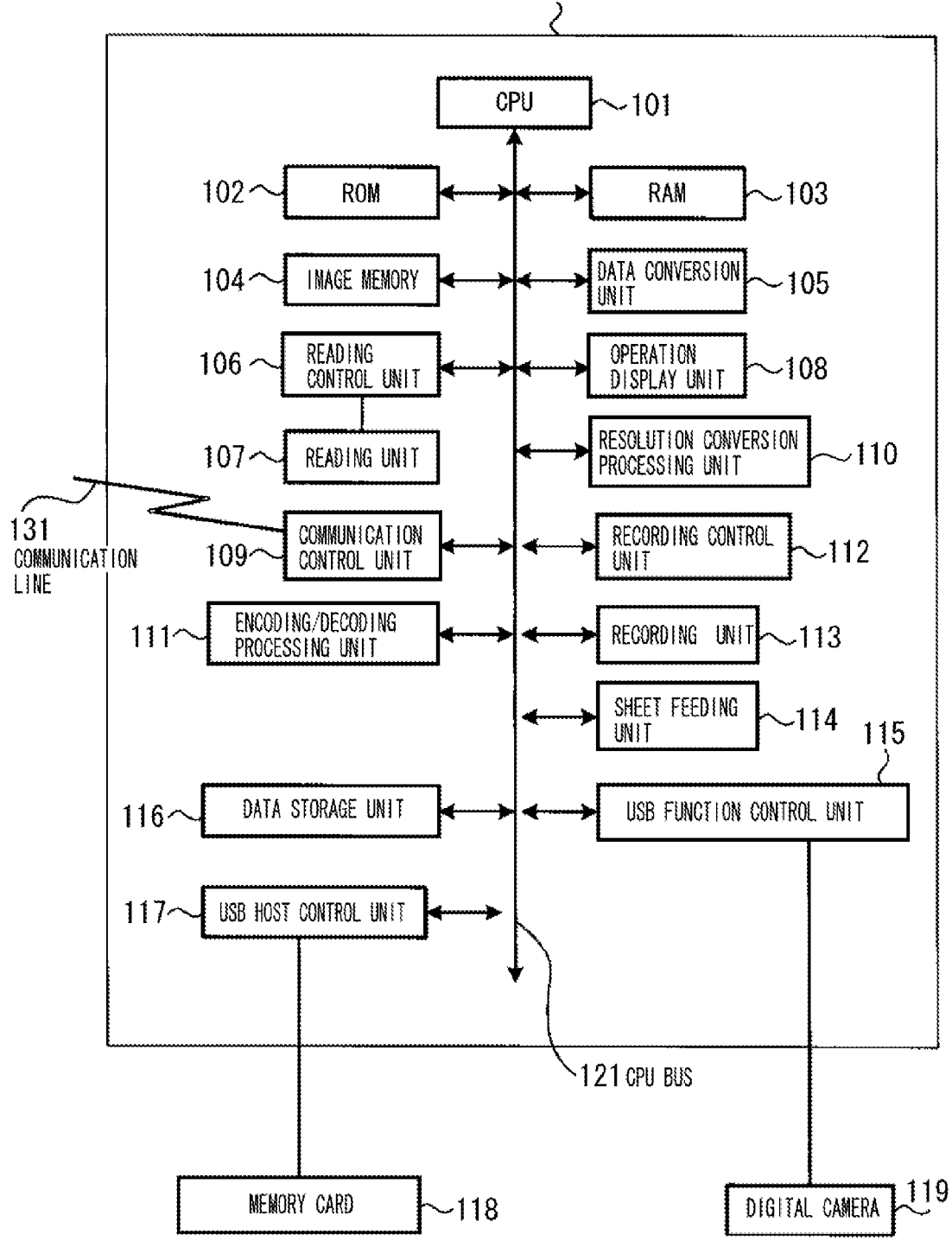
FIG. 1 is a block diagram illustrating the configuration of an image processing apparatus according to an exemplary embodiment of the present invention.

FIG. 1 is a block diagram illustrating the configuration of an image processing apparatus 100 according to an exemplary embodiment of the present invention. In the image processing apparatus 100, a central processing unit (CPU) 101 is a system control unit that controls the entire image processing apparatus 100.

A read only memory (ROM) 102 stores a control program and an embedded operating system (OS) program, which are executed by the CPU 101. In this exemplary embodiment, various control programs stored in the ROM 102 perform software control over scheduling or task switches under the control of the embedded OS program stored in the ROM 102. The following control procedure can be stored in, for example, the ROM 102 as a program of the CPU 101.

A random access memory (RAM) 103 includes a storage element such as a static read only memory (SRAM). The RAM 103 stores program control variable etc. The RAM 103 also stores a setting value registered by an operator or management data about the image processing apparatus 100. In addition, the RAM includes buffer areas for various work.

An image memory 104 includes a dynamic random access memory (DRAM) etc., and stores image data. A data conversion unit 105 analyzes a page description language (PDL) or converts image data, for example, expands character data to computer graphics (CG). A reading control unit 106 controls a reading unit 107 that optically scans a document with a contact image sensor (CIS). The reading unit 107 includes the CIS image sensor and in addition, an image sensor conveying unit and/or a document conveying unit for relatively moving the image sensor and the document.

In this exemplary embodiment, the reading control unit 106 supports a sheet scanning control system that reads a document being conveyed, and a book reading control system that scans a document set on a document positioning plate. Image signals obtained by converting electrical image data scanned by the reading unit 107 are subjected to various types of image processing such as a binarizing process or a halftone process through an image processing control unit (not shown) As a result, high-definition image data is obtained.

An operation display unit 108 includes an operation unit that helps a user in determining a destination of an image or setting registration values, or in registering settings of a power save mode, various keys and a display unit including a light emitting diode (LED) and a liquid crystal display (LCD).

The operation unit of the operation display unit 108 includes a keyboard provided with a number input key, a character input key, a one-touch dial key, a mode set key, an enter key, and a cancel key. The display unit of the operation display unit 108 is used for various kinds of operator's operations to input data or used to display an operational condition or a status of the image processing apparatus 100.

A communication control unit 109 includes a modulator-demodulator (MODEM) and a network control unit (NCU). In this exemplary embodiment, the communication control unit 109 is connected to an analog communication line (public switched telephone network (PSTN)) 131. The communication control unit 109 controls communications based on a T30 protocol and controls a communication line such as calling and call-in.

A resolution conversion processing unit 110 controls resolution conversion such as mm-inch resolution conversion of image data. In this exemplary embodiment, the resolution conversion processing unit 110 can also enlarge/reduce image data. An encoding/decoding processing unit 111 performs encoding/decoding or enlarging/reducing of image data (e.g., a MH, MR, MMR, JBIG, or JPEG format), which is processed by the image processing apparatus 100.

A recording control unit 112 executes various types of image processing such as smoothing, recording density correction, and color correction on image data of a print target, and converts the data into high-definition image data and then outputs the resultant data to a recording unit 113 (as described below). Further, the recording control unit controls the recording unit 113 to obtain status information about the recording unit 113 at regular intervals.

The recording unit 113 is a printing apparatus (printer engine) including a laser beam printer or an inkjet printer. The recording unit 113 prints color image data or monochrome image data on a printing material.

A sheet feeding unit 114 holds sheets onto which the recording unit 113 prints data. The sheet feeding unit 114 can feed sheets to the recording unit 113 under the control of the recording control unit 112. Further, plural sheet feeding units 114 can be provided to hold various types of sheets in one apparatus. In such a case, it is determined which sheet feeding unit feeds a sheet under the control of the recording control unit 112.

A universal serial bus (USB) function control unit 115 controls communication of a USB interface. The USB function control unit 115 performs protocol control in conformity to USB communication standards, and packetizes data of a USB control task executed by the CPU 101. The USB function control unit 115 can send USB packets to an external information processing terminal. On the other hand, the unit can convert USB packets sent from the external information processing terminal to data and send the converted data to the CPU 101.

A data storage unit 116 stores various kinds of data. The DRAM of the image memory 104 includes no backup area. Therefore, in this exemplary embodiment, the data storage unit 116 is prepared as a data storage area. The data storage unit 116 can be shared with the image memory 104. Further, data can be backed up to the data storage unit 116. In this exemplary embodiment, the data storage unit 116 is a DRAM but may be a hard disk or a volatile memory. A storage unit of the data storage unit 116 is not limited by the present invention.

A USB host control unit 117 is a control unit that enables communications based on a protocol specified by the USB communication standards.

The USB communication standards related to the USB function control unit 115 and the USB host control unit 117 are standards that allow high-speed two-way data communications. According to the USB communication standards, plural hubs or functions (slaves) can be connected to one host (master). In this exemplary embodiment, the host is connected to one device in a one-to-one relationship in a USB connection form for recording. A digital camera 119 can be connected to the processing apparatus 100. The digital camera 119 can transmit data of a captured image to the processing apparatus 100 via the USB function control unit 115.

A memory card 118 is a data storage medium, which is connectable with the image processing apparatus 100. In this exemplary embodiment, the memory card 118 is USB-connected with the USB host control unit 117 but may be interfaced in any other form. The memory card 118 stores image data or other electronic data. The image processing apparatus 100 can access data in the memory card 118 through the USB host control unit 117. The blocks 101 to 106 and 108 to 114 of FIG. 1 are mutually connected through a CPU bus 121 managed by the CPU 101.

In this exemplary embodiment, the reading unit 107 and the reading control unit 106 can scan a text document and store a file of document data in the data storage unit 116 through the processing in the resolution conversion processing unit 110 or the data conversion unit 105. The data storage unit 116 also stores information about the total number of pages of the scanned document data as well as the document data, in association with the document data.

The image processing apparatus is configured to enable document search according to operations input in the operation display unit 108. A search program executed by the CPU 101 plays a central part in document search.

In the case where a keyword is searched for in document image data scanned by the reading unit 107, the CPU 101 utilizes optical character recognition (OCR) processing as needed. This OCR processing can be executed using special hardware or a character recognition program executed by the CPU 101.

The present exemplary embodiment is not intended for only the above document data. For example, data stored in the data storage unit 116 such as data transferred from the memory card 118 or data sent through the communication control unit 109 can be searched as above described insofar as a target document includes page information.

Figure 2:
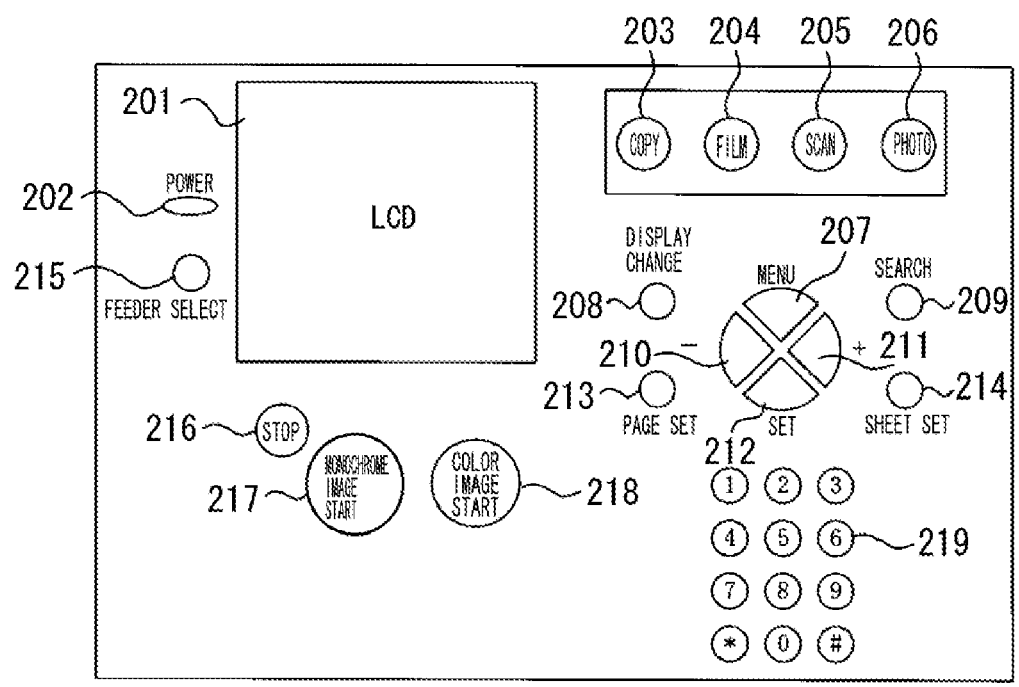
FIG. 2 is an explanatory view illustrating a specific example of an operation display unit of the image processing apparatus of FIG. 1.

FIG. 2 illustrates a specific example of the operation display unit 108 of the image processing apparatus 100. The operation display unit 108 includes an LCD 201 (display device) as a display unit and a keyboard including the following operation keys. A power key 202 is used to turn on/off a main power.

A copy mode key 203 is used to specify a copy mode that is not FAX or other such communication modes. The copy mode key 203 brings the image processing apparatus 100 into a state ready for copying. By pressing the copy mode key 203, the apparatus is set to a copy mode.

A film mode key 204, a scan mode key 205, and a photo mode key 206 are used to select a mode for scanning (scanning a document), in particular, scan/print mode that can be selected according to document characteristics.

Among the keys, the film mode key 204 shifts the image processing apparatus 100 from a film mode to a state ready for scanning/printing. The scan mode key 205 brings the image processing apparatus 100 into a state ready for scanning. The photo mode key 206 brings the image processing apparatus 100 into a state ready to directly print data from a card storing digital photographs or a camera.

The CPU can perform control such that by pressing the copy mode key 203, the apparatus is brought into a copy mode, while by pressing the film mode key 204, the scan mode key 205, or the photo mode key 206, the apparatus is brought into a FAX (communication) mode. A menu key 207 and a display change key 208 are used to change a menu or display in various user interfaces.

The menu key 207 is used to display items for setting values in copying, faxing, or direct printing from a card. By pressing the menu key 207, various setting items are displayed on the LCD 201. In addition, setting information can be selected using the following + (plus) key 211 or − (minus) key 210 and then set by a set key 212. Information displayed on the LCD can be switched when the display change key 208 is pressed.

A search key 209 is used to input a search condition in searching document data. In the apparatus according to the present embodiment, a keyword input with the search key can be used as a search keyword. Characters can be entered with the following numeric keypad.

A − key 210, a + key 211, and a set key 212 help a user make a selection from among plural alternatives in a menu or in making user registration. The − key 210 and the + key 211 are also used to increase/decrease numerical values input in a user interface. The "−" and "+" indicate forward and reverse movement directions or decrease and increase in numerical information, respectively. The set key 212 is used to confirm selected items.

A page set key 213 is used to designate a page. By designating the page, a page to be displayed or a page to be displayed can be set. A sheet set key 214 issued to set a sheet, for example, select a sheet in the sheet feeding unit 114. A sheet for copying or printing can be set by pressing the sheet set key 214.

A feeder select key 215 is used to make a selection from among a plurality of sheet feeding mechanisms when a plurality of sheet feeding units 114, for example, the sheet feeding unit 114 and another manual sheet feeding port are provided.

A STOP key 216 is used to stop or suspend various kinds of processing, faxing, copying, or other such operations. A monochrome image start key 217 and a color image start key 218 are used to start reading/printing/faxing of a monochrome image and a color image, respectively.

The operation unit is provided with a numeric keypad 219 for inputting numerical information. The numeric keypad 219 includes keys numbered 0 to 9, and is used in combination of the keys to input characters. The LCD 201 is used as a display unit for displaying a message, an operation prompt, and various types of information. Next, operations of the thus-configured image processing apparatus 100 are described.

Figure 3A:
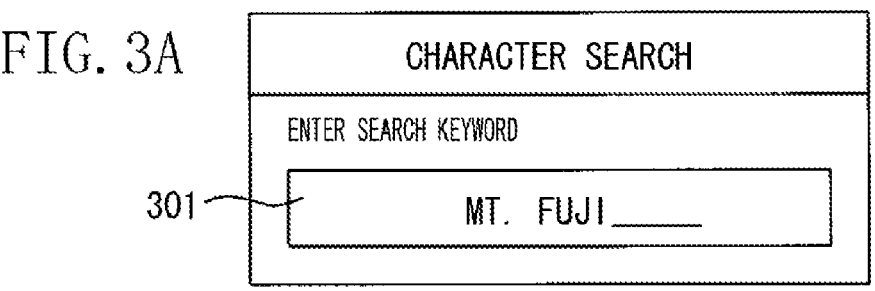
FIGS. 3A to 3C are views illustrating an example of display on a liquid crystal display (LCD) in a searching process.
Figure 3B:
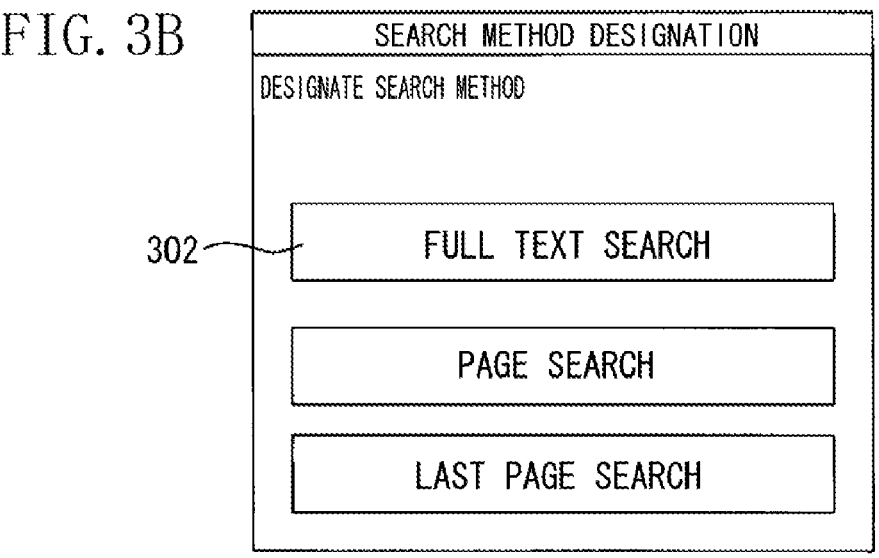
Figure 3C:
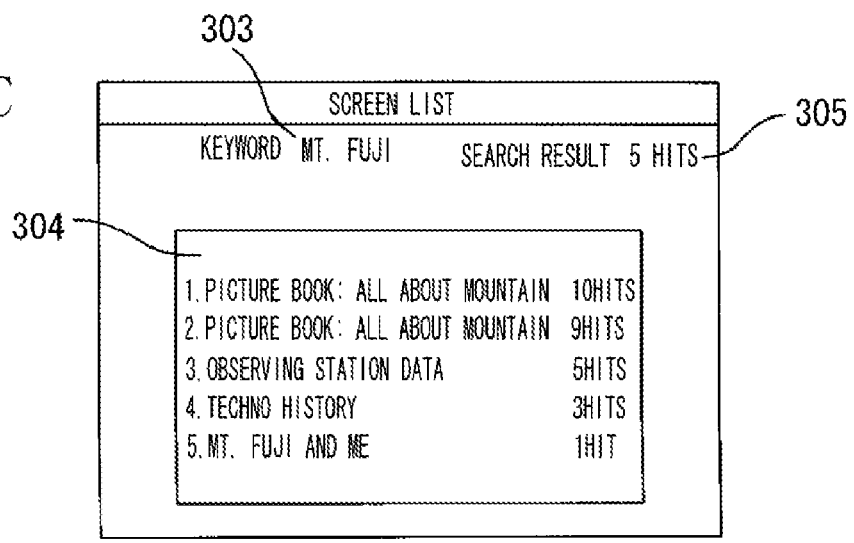

FIGS. 3A to 3C illustrate a display example of the LCD 201 during document search processing. FIG. 3A illustrates how a search keyword is input with the search key 209 on a screen for inputting search conditions. The search keyword is input into a field 301. "Mt. Fuji" within a frame is a character string input as a search keyword (search key).

As for characters input in this exemplary embodiment, kana characters, kanji characters, and alphanumeric characters can be input using keys of the numeric keypad 219 in combination. However, as a method of inputting a search key, an optional or external full keyboard may also be used, or the key may be input by voice or by scanning a document with a reading unit.

FIG. 3B illustrates an example of a display screen for designating a search method (search condition). A choice item 302 gives three choices: full-text search, page search, and last page search in this example.

Among the items, the "full-text search" targets all pages of the whole document. The "page search" targets a designated page, for example, the third page. The page is designated and input with the numeric keypad 219 separately. In the case of designating one or more pages, a user may designate not only one page but also a plurality of pages using commas like "1, 3, 5". Besides, a search range may be specified like "page 1 to page 3". Likewise, the "last page search" targets the last page only.

Search conditions displayed on the LCD 201 as illustrated in FIG. 3B can be selected/determined using the numeric keypad 219 and the set key 212.

After the search keyword and the search method (search conditions) is input as described above, a search program of the CPU 101 is started to search for a search keyword in a target document. In the searching process, a document is directly searched for a character string. Alternatively, in the case where a document includes image data, a character string is searched for based on a character code extracted from a document through the OCR processing.

A search result can be displayed as illustrated in FIG. 3C, for example. If FIG. 3C, five hits are found with respect to a keyword "Mt. Fuji" and displayed in list form. In this example, document file names (identification information) are listed as a search result. FIG. 3C illustrates a search keyword 303 used for search, a search result list 304, and a hit count 305. As illustrated in FIG. 3C, a hit count of a keyword in a target document is displayed together with the list. This count is the number of search keywords found in a searched page only. In this exemplary embodiment, the count is displayed at the time of displaying the list but may be displayed at different time or in a different way as long as a user can recognize the count.

Figure 4:
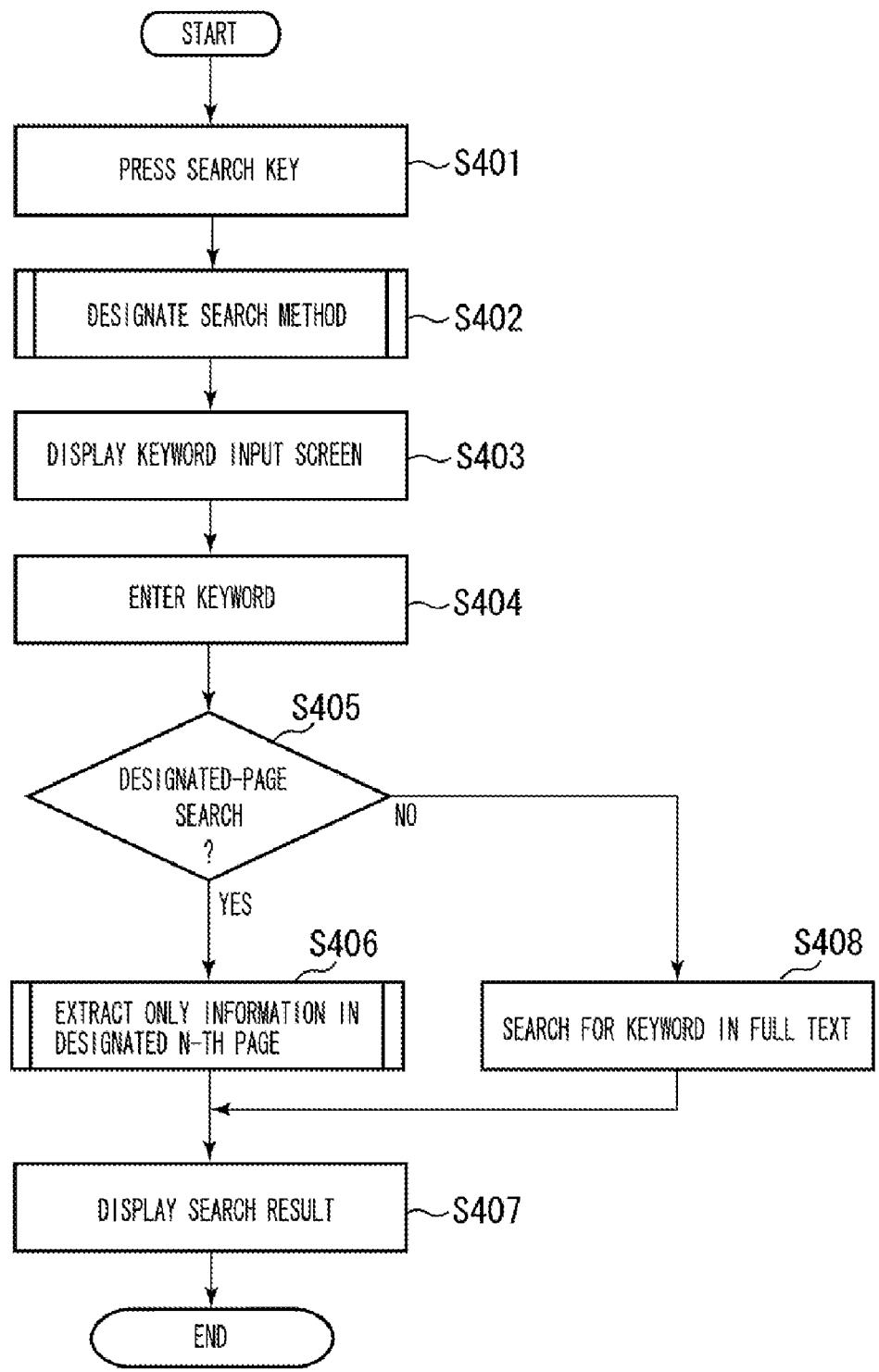
FIG. 4 is a flowchart illustrating a control flow for searching a designated page.

FIG. 4 illustrates a flow of searching of a designated page. The processing of FIG. 4 is described as a control program executed by the CPU 101 and stored in, for example, the ROM 102 (similar to processing of the following flowchart).

If a user presses the search key 209 in step S401 of FIG. 4, the CPU 101 designates a search method in step S402. In this exemplary embodiment, the search method can be selected as illustrated in FIG. 3B. The process of selecting a search method and designating a page to be searched according to an embodiment is described in detail below with reference to FIG. 5.

After a search method has been designated, the CPU 101 displays a keyword input screen in step S403. In step S404, a user enters a search keyword. In an embodiment, the keyword is entered via the input method illustrated in FIG. 3A.

When a user enters a keyword in step S404, the processing advances to step S405. In step S405, the CPU 101 determines whether designated-page search is selected in step S402. If the designated-page search is selected (YES in step S406), the processing advances to step S406. If the designated-page search is not selected (NO in step S406), the processing advances to step S408, and the CPU 101 executes full-text search.

In the case of the designated-page search, the CPU 101 extracts information of a page N designated by a user and searches the page in step S406. The search process is described below with reference to FIGS. 6, 7, and 8. After the completion of the search process, the CPU 101 displays search results in step S407. As for a display form, the search results are displayed in list form as illustrated in FIG. 3C.

Figure 5:
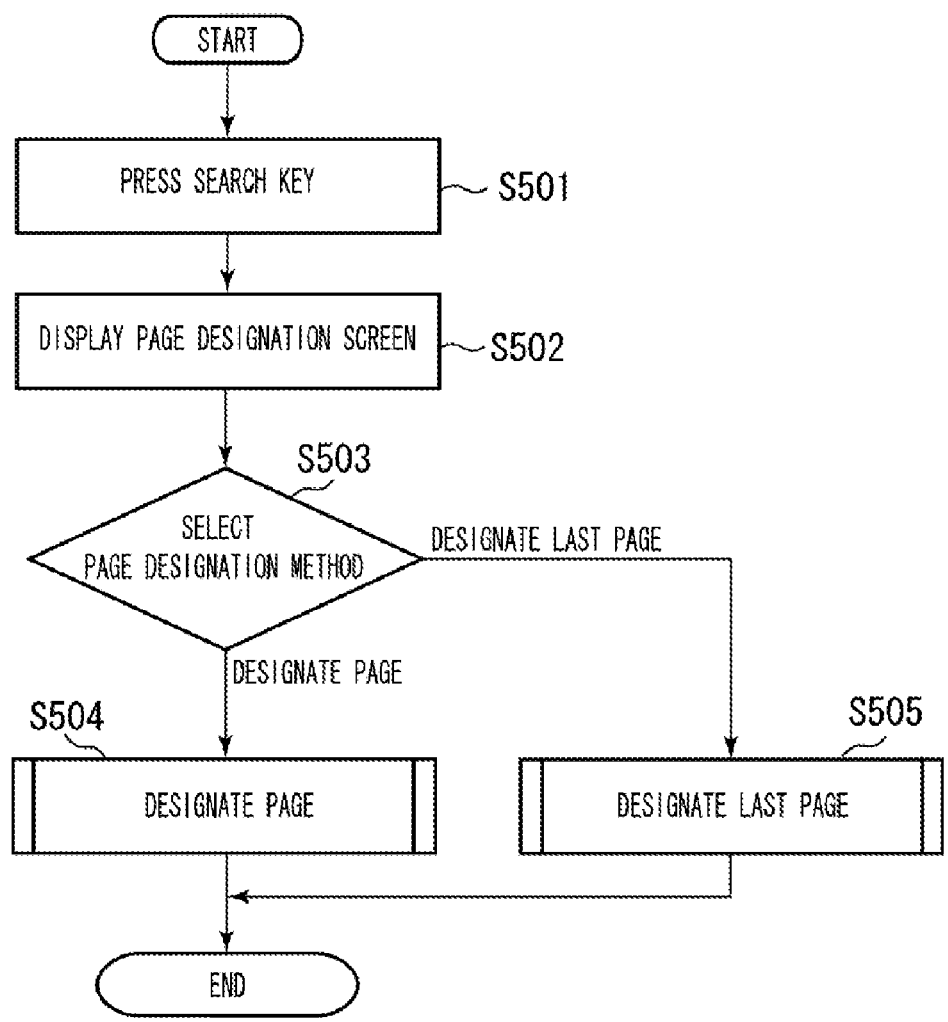
FIG. 5 is a flowchart illustrating a control flow for designating a page to be searched.

In the case of the full-text search, the CPU 101 searches the full text in step S408. This search process is similar to the generally performed process for extracting an input keyword from all the stored documents to search the documents. After the completion of the processing in step S408, the CPU displays search results as above described in step S407. FIG. 5 is a flowchart illustrating an example of processing for designating a page to be searched.

First, in step S501, the CPU 101 confirms that a user has pressed the search key 209. Next, in step S502, the CPU 101 displays a screen for selecting a search method for searching a designated page on the LCD 201. The displayed selection screen is configured as illustrated in FIG. 3B but another type of selection screen may be used as long as a search method can be designated.

Next, the CPU 101 prompts a user to select a page designating method in step S503. In this example, the CPU gives three choices: first-page search, designated-page search, and last-page search. The first-page search is similar to search in the first page based on the designated-page search. Thus, if a user selects the first-page search and the designated-page search in step S503, the processing advances to step S504.

In step S504, the CPU 101 prompts a user to designate a page to be searched. The page is designated by the user selecting a page number N with the numeric keypad 219, for example. In step S505, the CPU 101 designates the last page as a search target. In this example, the CPU 101 saves selection of the last page selected in step S503 and completes the processing. In this example, the page is designated using a panel but may also be selected using different user interface as long as the interface allows the user to designate a page as described in this exemplary embodiment.

Figure 6:
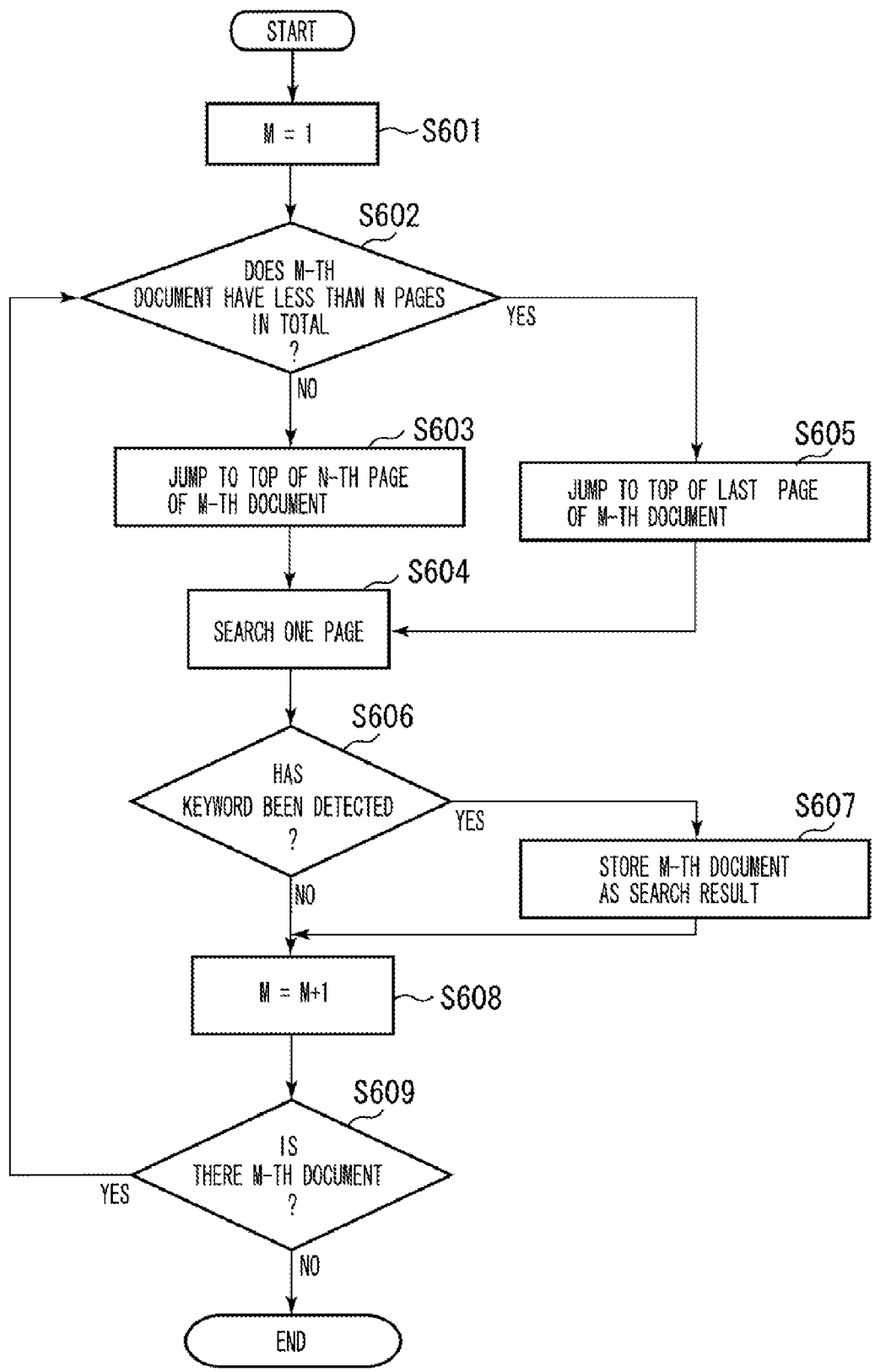
FIG. 6 is a flowchart illustrating a designated-page search process for searching a page N designated by a user.

FIG. 6 illustrates a designated-page search process for searching a page N designated by a user in step S406 of FIG. 4. In particular, in this example, the CPU specifies the last page as a search target in a case where a designated page cannot be searched (due to the absence of the page and the like).

First, the CPU 101 sets a document number M to 1 in step S601. Thus, the CPU can search documents in a document storage area within the apparatus in order from the document 1. Next, the CPU 101 determines whether the total number of pages of an M-th document is smaller than N specified in step S504 in step S602. If the total number of pages of the M-th document is smaller than N (YES in step S602), the processing advances to step S605; otherwise (NO in step S602), the processing advances to step S603.

In step S603, the CPU 101 jumps to the top of an N-th page of the M-th document. Next, the CPU 101 searches one page in step S604. Thus, the CPU 101 can search only the N-th page of the M-th document. Accordingly, the process described with reference to FIG. 6 enables a character string search to be performed only in the N-th page (i.e., designated page(s) to be searched) of the M-th document without performing the character string search in other pages (i.e., non-designated pages) of the M-th document. The processing shifts to step S605 if the M-th document includes no page N. Accordingly, the CPU 101 jumps to the last page of the M-th document and searches one page in step S604. Thus, the CPU can search a page N or the last page of the M-th document.

Next, the CPU 101 determines whether a search keyword input in step S404 is found in the page in step S606. If the keyword is found (YES in step S606), the CPU 101 saves a document number M for displaying the M-th document as a search result in step S607. As for a method of saving the document number, the CPU may save M as the M-th document and list search results, but any other methods can be used as long as a document can be specified.

Next, the CPU 101 increments M by 1 in step S608. Next, the CPU 101 determines whether the M-th document is saved in step S609. If saved (YES in step S609), the CPU 101 repeats the search process from step S602. In this way, the CPU searches designated pages of all document files stored in the data storage unit 116.

Figure 7:
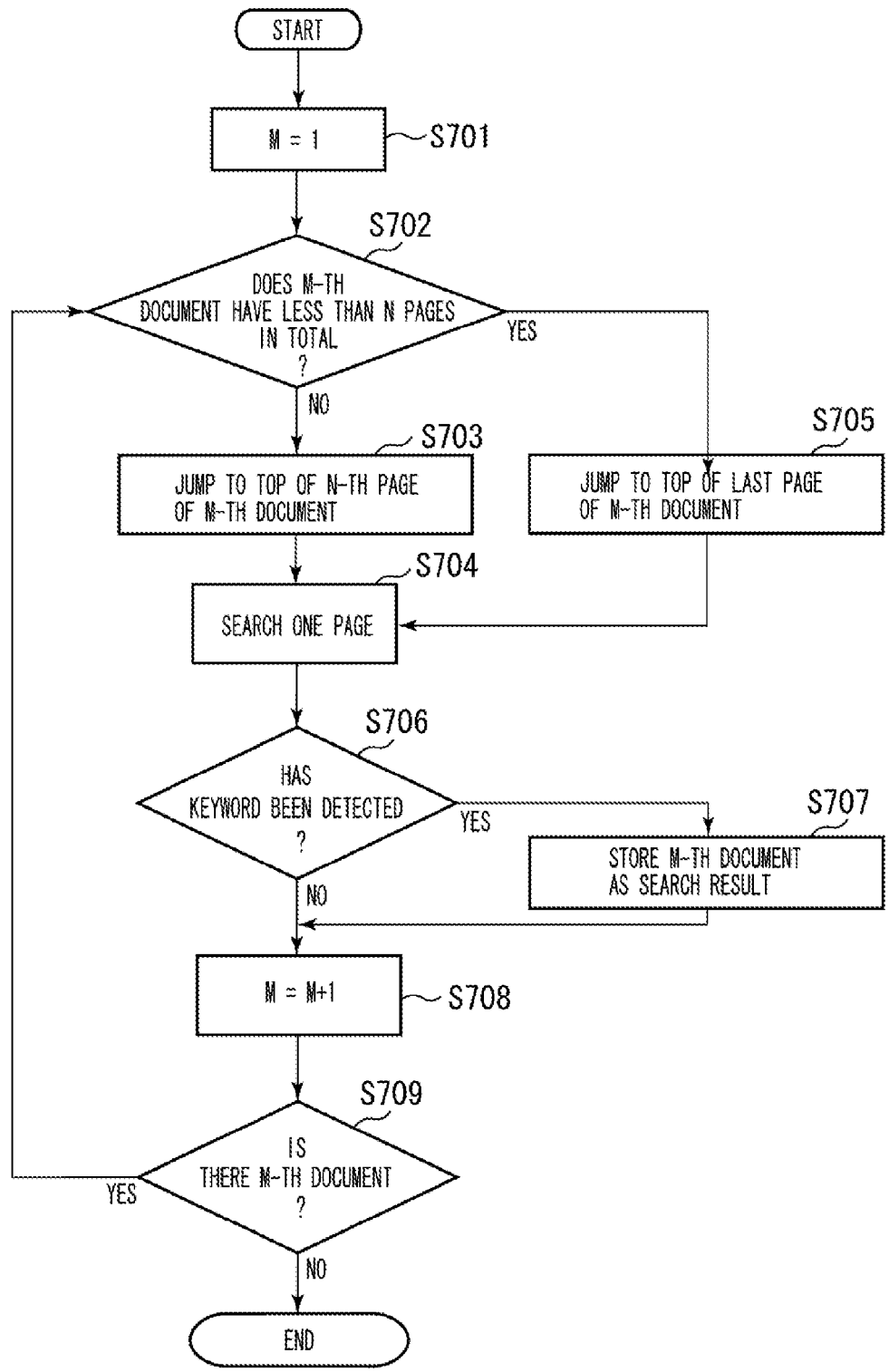
FIG. 7 is a flowchart illustrating an example where the first page is displayed when searching of a designated page cannot be carried out.

FIG. 7 illustrates another example of the processing in step S406 of FIG. 4. In this example, the CPU specifies the top page (first page) as a search target in a case where a designated page cannot be searched (due to the absence of the page and the like). First, the CPU 101 sets a document number M to 1 in step S701. Thus, the CPU 101 can search documents stored in the document storage area of the apparatus in order from the document 1.

Next, the CPU 101 determines in step S702 whether the total number of pages of the M-th document is smaller than N designated in step S504. If the total number of pages of the M-th document is smaller than N (YES in step S702), the processing advances to step S705; otherwise, the processing advances to step S703 (NO in step S702).

In step S703, the CPU 101 jumps to the top of the N-th page of the M-th document. Next, in step S704, the CPU 101 searches one page. Thus, the CPU can search the N-th page of the M-th document.

The processing shifts to step S705 if the M-th document does not include the page N. Accordingly, the CPU 101 jumps to the top of the first page of the M-th document and CPU 101 searches one page in step S704. In this way, the CPU can search the page N or the first page of the M-th document.

Next, the CPU 101 determines whether a search keyword input in step S404 is found in the page in step S706. If the keyword is found (YES in step S706), the CPU 101 saves a document number M to display the M-th document as a search result in step S707. As for a method of saving the document number, the CPU may save M as the M-th document and list search results, but another method can be used insofar as a document can be specified.

Next, the CPU 101 increments M by 1 in step S708. Next, the CPU 101 determines whether the M-th document is saved in step S709. If the document is found (YES in step S709), the CPU 101 repeats the above search process from step S702.

Figure 8:
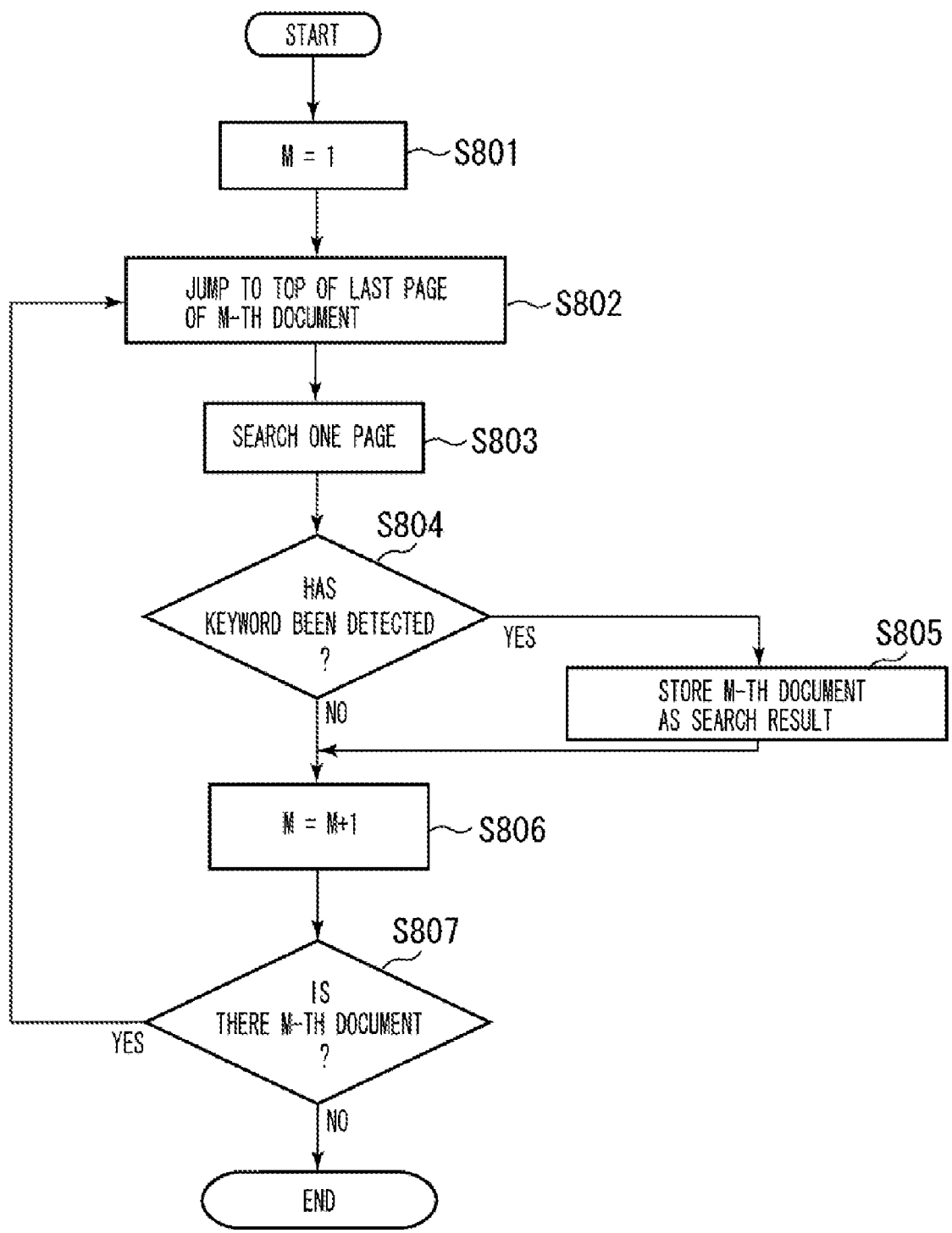
FIG. 8 is a flowchart illustrating processing for designating the last page as a search target.

FIG. 8 illustrates another example of the processing of step S406 in FIG. 4. In this example, the CPU searches the last page as a page designating method. First, the CPU 101 sets a document number M to 1 in step S801. Thus, the CPU can search documents stored in a document storage area within the apparatus in order from the document 1. Next, the CPU 101 jumps to the top of the last page of the M-th document in step S802 and then, the CPU 101 searches one page in step S803.

Next, the CPU 101 determines in step S804 whether a keyword input in step S404 in the page. If the keyword is found (YES in step S804), the CPU 101 saves a document number M to display the M-th document as a search result in step S805. As for a method of saving the document number, the CPU may save M as the M-th document and list search results, but another method can be used insofar as a document can be specified.

Next, in step S806, the CPU 101 increments M by 1. Next, in step S807, the CPU 101 determines whether the M-th document is saved. If the document is saved (YES in step S807), the CPU 101 repeats the above search process in order from step S802.

According to the above method, the CPU can execute keyword (string) search only to a designated page in document data. In this case, the CPU narrows down to a designated page and searches the designated page alone, so a search speed can be increased. As a result, even if the CPU only has conventional computation performance, the CPU can perform search smoothly at high speed in an apparatus storing a large amount of document data. In particular, if a large amount of document file is stored, higher search efficiency can be expected.

In the above exemplary embodiment, if the apparatus stores a search target document which includes plural pages, and stores metadata of the text, the CPU performs search process on text information. However, the present invention is not limited to the above processing in the case of searching for a keyword on a page-by-page basis. For example, the present invention enables search in document data that is obtained by processing a document image scanned with the reading unit 107 and storing the image in a text data format through the OCR.

Second Exemplary Embodiment

In the above first exemplary embodiment, search results are displayed in list form as illustrated in FIG. 3C but may be listed in the form of image as described in the present exemplary embodiment.

In the present exemplary embodiment, the control about the hardware configuration and basic reading/printing/communication process of the apparatus is similar to the first exemplary embodiment. Further, a flow for searching a designated page is similar to FIG. 4.

Further, the processing of the present exemplary embodiment in FIGS. 10 to 13 corresponds to the first exemplary embodiment in FIGS. 5 to 8. FIG. 9 illustrates an example of designating a search method and displaying search results in the present exemplary embodiment.

Figure 9A:
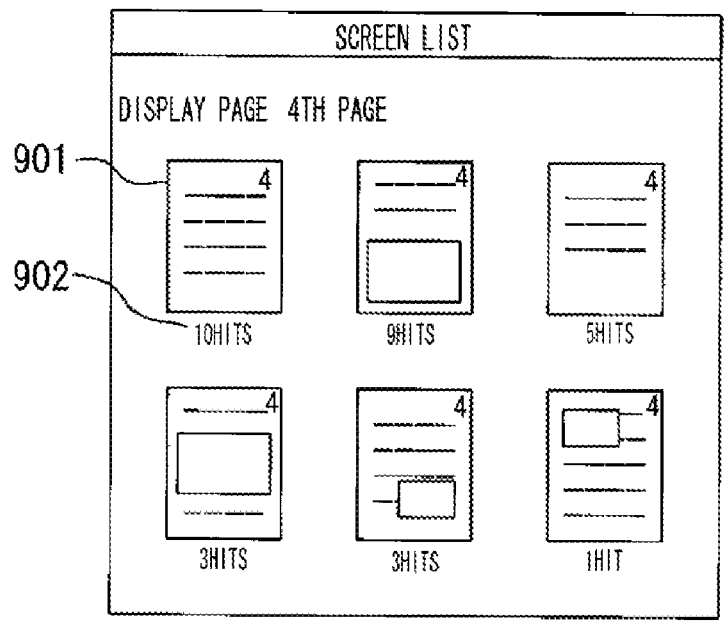
FIGS. 9A and 9B are views illustrating a display example where a search result is displayed in list form of reduced images.
Figure 9B:
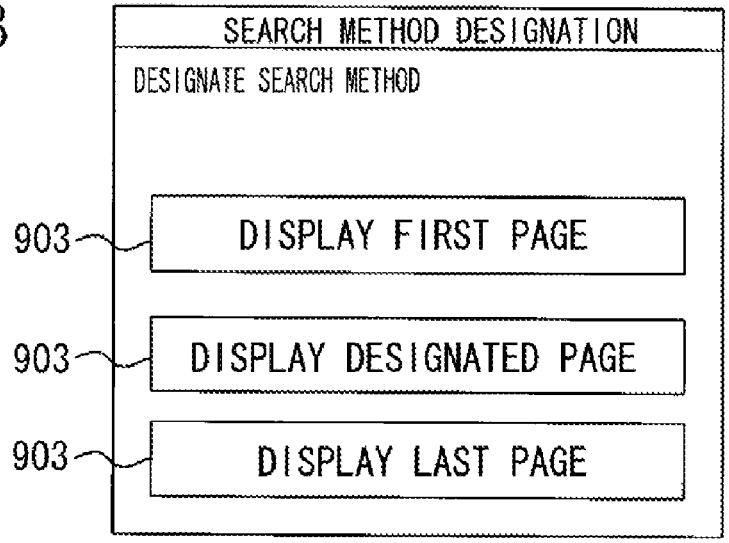

FIG. 9A illustrates a display example where a list of search results is displayed in the form of reduced image after the document search is completed. FIG. 9B illustrates an example of a display screen for designating a search method.

Search results are displayed in an image list 901 in FIG. 9A. In this example, in a form of icons 901, a list of documents that were searched for a keyword is displayed. Also displayed is a hit count 902 of search keywords in a designated page of the document. This screen is displayed on the LCD 201 to allow a user to select/determine an image (901) corresponding to a desired document by using the numeric keypad 219 and the set key 212.

FIG. 9B illustrates a display screen for designating a search method. A selection item 903 allows a user to make a selection from first-page display and search, designated-page display and search, and last-page display and search. This screen is displayed on the LCD 201 and a user can select/determine a desired one using the numeric keypad 219 and the set key 212.

Figure 10:
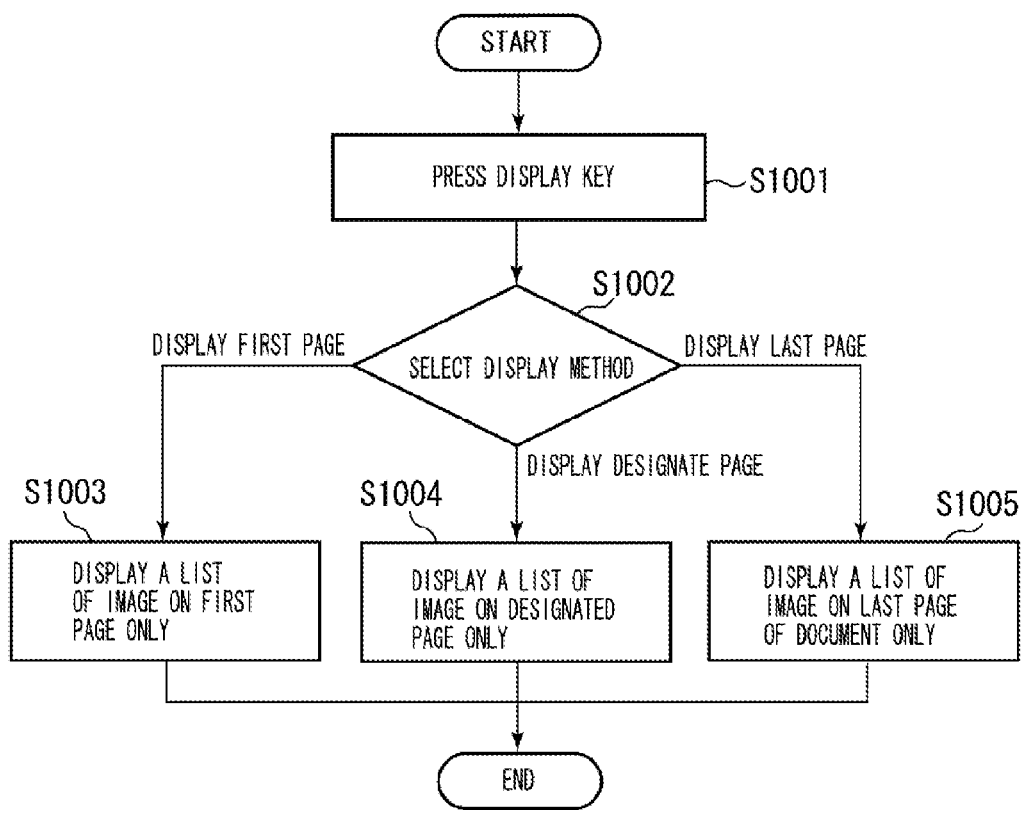
FIG. 10 is a flowchart illustrating processing for searching a designated page and determining a display form.

In the present exemplary embodiment, a method of designating a keyword is similar to that of FIG. 3A. FIG. 10 illustrates a flow of control for searching a designated page and determining a display form in this exemplary embodiment. Also in the present exemplary embodiment, the search in a designated page is similar to FIG. 4, and the processing in step S402 of FIG. 4 corresponds to that of FIG. 10.

If the CPU 101 confirms that a user presses the display change key 208 in step S1001 of FIG. 10, the CPU 101 selects a display form in step S1002. The display form is selected by a user with the keys of the numeric keypad 219 and the set key 212.

If the first-page display is selected in step S1002 (DISPLAY FIRST PAGE in step S1002), the CPU 101 saves the selected display form that displays a list of images of the first page only in step S1003. If the designated-page display is selected in step S1002 (DISPLAY SPECIFIED PAGE in step S1002), the CPU 101 saves the selected display form that displays a list of images of the designated page only in step S1004.

If the last-page display is selected in step S1002 (DISPLAY LAST PAGE in step S1002), the CPU 101 saves the selected display form that displays a list of images of the last page only in step S1005. In this way, the display form can be selected and saved.

Figure 11:
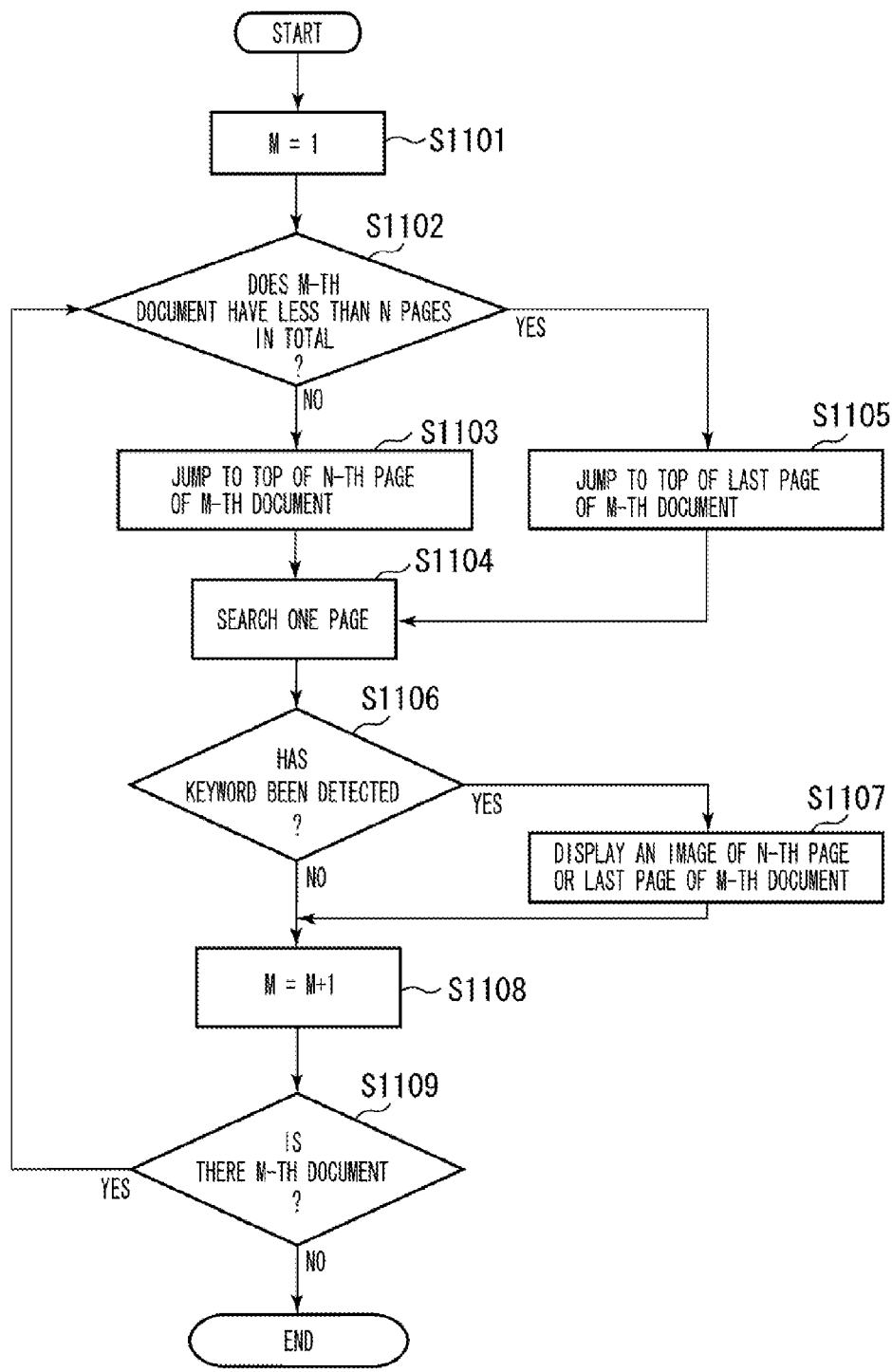
FIG. 11 is a flowchart illustrating processing for displaying the last page and displaying a search result in list form if searching of a designated page cannot be carried out.

FIG. 11 illustrates detailed processing in step S406 of FIG. 4 according to this exemplary embodiment, in particular, processing for selecting the last page and displaying a list of search results if a method of searching a designated page is unfit for search.

First, the CPU 101 sets a document number M to 1 in step S1101. As a result, the CPU can search documents in a document storage area within the apparatus in order from the document 1. Next, the CPU 101 determines whether the total page of pages of the M-th document is smaller than N specified in step S504 in step S1102. If the total page of pages of the M-th document is smaller than N (YES in step S1102), the processing advances to step S1105; otherwise (NO in step S1102), the processing advances to step S1103

In step S1103, the CPU 101 jumps to the top of the N-th page of the M-th document. Next, the CPU 101 searches one page in step S1104. As a result, the CPU 101 can search only the N-th page of the M-th document.

Further, the processing shifts to step S1105 if the M-th document does not include the page N. Accordingly, the CPU 101 jumps to the top of the last page of the M-th document, and the CPU 101 searches one page in step S1104.

As described above, the CPU 101 can search the page N or the last page of the M-th document. Next, the CPU 101 determines in step S1106 whether a keyword input by a user in step S404 is found in the page. The CPU 101 stores an image to display the page N of the M-th document if the keyword is found (YES in step S1106), or an image to display the last page if the document does not include the page N (NO in step S1106) in order to display the M-th document as a search result on the LCD 201 in step S1107.

At this time, the pages of the searched document are listed as illustrated in FIG. 9A. An image displaying method and a display format are not limited to the illustrated ones. Next, in step S1108, the CPU 101 increments M by 1. Next, the CPU 101 determines in step S1109 whether the M-th document is stored. If the M-th document is stored (YES in step S1109), the CPU 101 repeats the above search process in order from step S1102.

Figure 12:
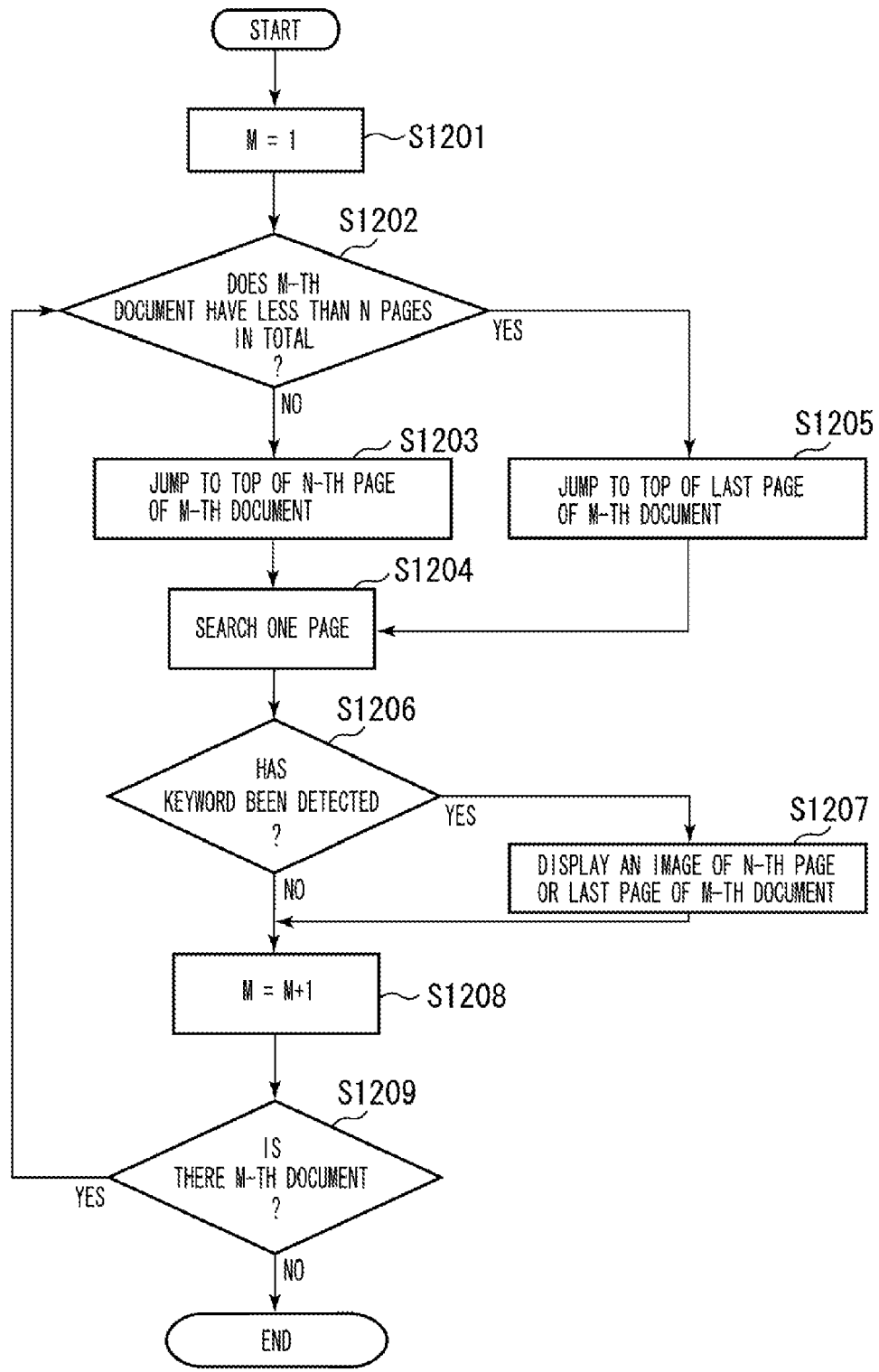
FIG. 12 is a flowchart illustrating processing for displaying the first page and displaying a search result in list form if searching of a designated page cannot be carried out.

FIG. 12 illustrates an example where the first page is selected to display a list of search results if a keyword cannot be searched based on the designated-page search in step S406 of FIG. 4.

First, the CPU 101 sets a document number M to 1 in step S1201. As a result, the CPU 101 can search documents stored in the document storage area of the apparatus in order from the document 1. Next, the CPU 101 determines in step S1202 whether the total number of pages of the M-th document is smaller than N specified in step S504.

If the total number of pages of the M-th document is smaller than N (YES in step S1202), the processing advances to step S1205; otherwise, the processing advances to step S1203 (NO in step S1202). In step S1203, the CPU 101 jumps to the top of the N-th page of the M-th document.

Next, in step S1204, the CPU 101 searches one page. Thus, the CPU 101 can search the N-th page of the M-th document. The processing shifts to step S1205 if the M-th document does not include the page N. Accordingly, the CPU 101 jumps to the top of the first page of the M-th document, and the CPU 101 searches one page in step S1204. Through this processing, the CPU 101 can search the page N or the first page of the M-th document.

Next, in step S1206, the CPU 101 determines whether a keyword input in step S404 is found in the page. The CPU 101 stores an image to display the page N of the M-th document if the keyword is found (YES in step S1206), or an image to display the first page if the document does not include the page N (NO in step S1206) in order to display the M-th document as a search result on the LCD 201 in step S1207.

At this time, the pages of the searched document are listed as illustrated in FIG. 9A. An image displaying method and a display format are not limited to the illustrated ones.

Figure 13:
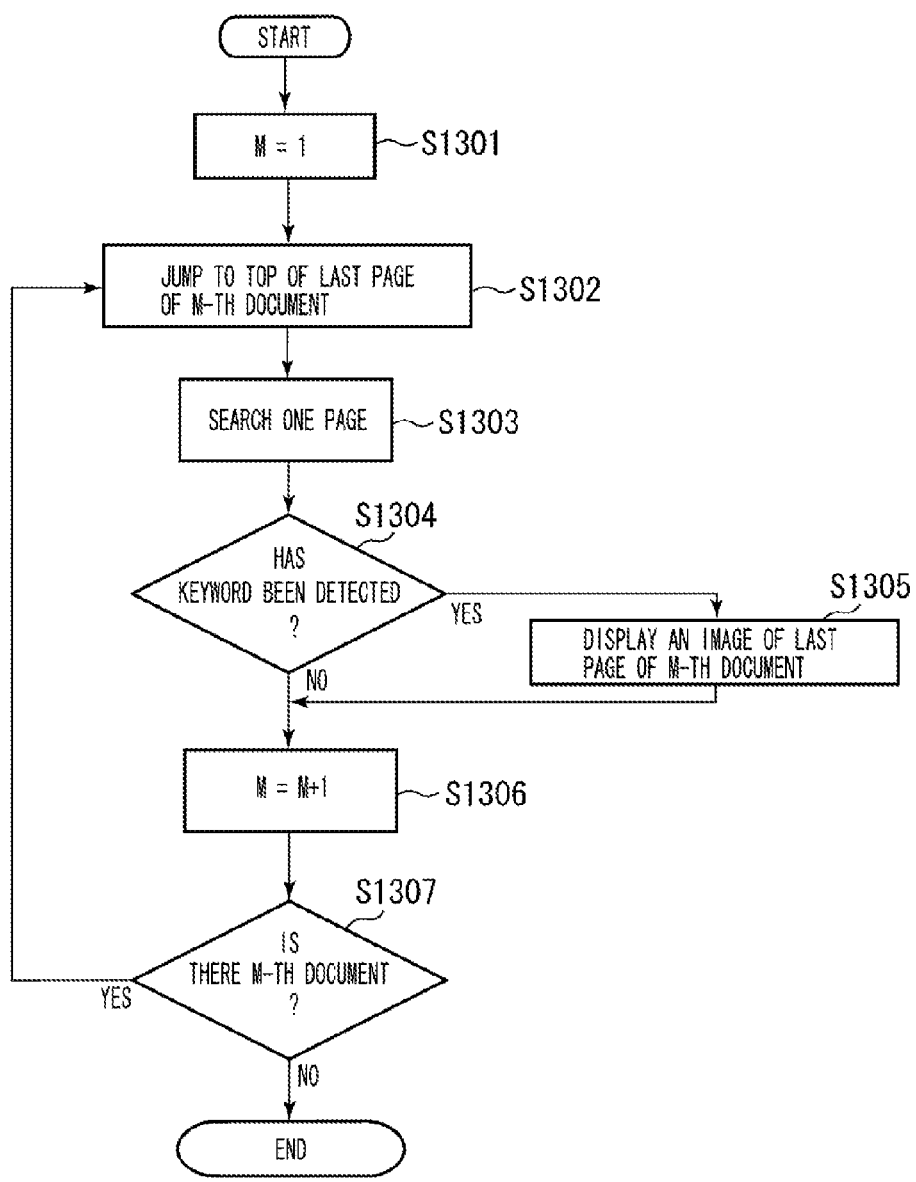
FIG. 13 is a flowchart illustrating processing executed in the case where the last page is selected according to a page designating method that specifies the last page.

Next, in step S1208, the CPU 101 increments M by 1. Next, the CPU 101 determines in step S1209 whether the M-th document is stored. If the M-th document is stored (YES in step S1209), the CPU 101 repeats the above search process in order from step S1202. FIG. 13 illustrates an example of processing in the case where the last page is designated by the method of designating a search page in step S406 of FIG. 4.

The CPU 101 sets a document number M to 1 in step S1301 of FIG. 13. As a result, the CPU 101 can search documents in a document storage area in order from the document 1. Next, the CPU 101 jumps to the top of the last page of the M-th document in step S1302.

Next, the CPU 101 searches one page in step S1303. Next, the CPU 101 determines in step S1304 whether a keyword input in step S404 is found in the page.

If the keyword is found (YES in step S1304), the CPU 101 stores an image to display an image of the last page of the specified document in order to display the M-th document as a search result on the LCD 201 in step S1305. In this case, the display form is, for example, that as shown in FIG. 9A, and the pages of the searched document are listed. However, a display form of the document image is not limited thereto.

Next, in step S1306, the CPU 101 increments M by 1. Then, the CPU 101 determines in step S1307 whether the M-th document is saved. If the document is saved (YES in step S1307), the CPU 101 repeats the above search process in order from in step S1302.

As described above, in the present exemplary embodiment, the CPU displays a list of search results. Thus, in addition to effects of the first exemplary embodiment, the present exemplary embodiment attains an advantage such that a user can browse all search results and easily select a desired page from the search results.

Third Exemplary Embodiment

In the second exemplary embodiment, a list of search results is displayed in the form of image. That form displays only search results. In a third exemplary embodiment, all documents can be displayed in a list form even if no search keyword is input.

The processing of the second exemplary embodiment as illustrated in FIGS. 4 and 10 is similar to the present exemplary embodiment. Further, the processing of the present exemplary embodiment as illustrated in FIGS. 14 to 16 corresponds to FIGS. 11 to 13 as illustrated in the second exemplary embodiment. Further, also in the third exemplary embodiment, a search method can be executed as above described in the second exemplary embodiment, and search results can be displayed similar to the second exemplary embodiment as illustrated in FIG. 9A.

FIG. 14 illustrates a control flow of processing for displaying top pages of search results in a list form. The CPU 101 sets a document number M to 1 in step S1401 of FIG. 14. As a result, the CPU 101 can search documents stored in a document storage area within the apparatus in order from the document 1.

Next, in step S1402, the CPU 101 jumps to the top page of the M-th document. Then, the CPU 101 displays an image of the top page of the M-th document as an icon in step S1403. Next, the CPU 101 increments M by 1 in step S1404. Next, the CPU 101 determines in step S1405 whether the M-th document is saved. If the document is saved (YES in step S1405), the CPU 101 repeats the above search process in order from step S1402.

As described above, in the present exemplary embodiment, the CPU 101 performs control to display an image of the top page as an icon and allow a user to click the icon. That is, the user can see a list of designated top pages even if the pages are not searched.

FIG. 15 illustrates a control flow for displaying designated pages of search results in a list form. The CPU 101 sets a document number M to 1 in step S1501 of FIG. 15. As a result, the CPU 101 can search documents stored in a document storage area of the apparatus in order from the document 1.

Next, in step S1503, the CPU 101 determines whether the total number of pages of the M-th document is smaller than N specified in step S504. If the total number of pages of the M-th document is smaller than N (YES in step S1503), the processing advances to step S1506; otherwise (NO in step S1503), the processing advances to step S1504.

Next, in step S1504, the CPU 101 jumps to the N-th page of the M-th document. Next, in step S1505, the CPU 101 displays an image of the page N of the M-th document as an icon. As a result, the CPU 101 can display only the N-th page of the M-th document.

The processing shifts to step S1506 if the M-th document does not include the page N. Accordingly, the CPU 101 jumps to the last page of the M-th document. In step S1507, the CPU 101 displays an image of the last page of the M-th document as an icon.

In this way, the CPU 101 can display an image of the page N or the last page of the M-th document. Next, in step S1508, the CPU 101 increments M by 1. Then, the CPU 101 determines whether the M-th document is saved in step S1509. If the document is saved (YES in step S1509), the CPU 101 repeats the search process in order from in step S1502. FIG. 16 illustrates an example where the last pages of search results are displayed in a list form.

First, in step S1601, the CPU 101 sets a document number M to 1. The CPU 101 can search documents in a document storage area within the apparatus in order from the document 1. Next, in step S1602, the CPU 101 jumps to the last page of the M-th document. Then, the CPU 101 displays the last page of the M-th document as an icon in step S1603. Next, in step S1604, the CPU 101 increments M by 1. Then, the CPU 101 determines in step S1605 whether the M-th document is saved. If the document is saved (YES in step S1605), the CPU 101 repeats the above search process in order from step S1602.

As described above, according to the present exemplary embodiment, a list of all documents can be displayed even if a keyword is not input. Hence, a user can check a list of designated pages even if no keyword is input. Further, the user can select a desired document from the list and perform predetermined processing such as display, printing, or faxing of the document data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-091032 filed Mar. 30, 2007, which is hereby incorporated by reference herein in its entirety.

What is claimed is:

1. An apparatus comprising:
   a storage unit configured to store a plurality of paginated document files;
   a search condition designation unit configured to receive a search condition from a user for use in searching the paginated document files, wherein the search condition is one of a full-text search to target all pages of the paginated document files for search and a designated page number search to target a designated page of the paginated document files for search;
   an input unit configured to input a search keyword for use in searching the paginated document files;
   a search unit configured to search for the search keyword within the paginated document files,
   wherein, in response to the search condition designation unit receiving a designated page number search as the search condition, the search unit automatically searches the paginated document files containing the search keyword within the designated page, and, in response to the search condition designation unit receiving the full-text search as the search condition, the search unit automatically searches the paginated document files containing the search keyword within any one of all pages.

2. The apparatus of claim 1, wherein the search unit further is configured to determine, in a case where the search condition designation unit receives the designated page number search as the search condition, whether the designated page exists in a target paginated document file and, in response to determining that the designated page does not exist in a first target paginated document file, the search unit searches the paginated document files containing the search keyword within the last page.

3. The apparatus of claim 1, wherein the search unit further is configured to determine, in a case where the search condition designation unit receives the designated page number search as the search condition, whether the designated page exists in a target paginated document file and, in response to determining that the designated page does not exist in a first target paginated document file, the search unit searches the paginated document files containing the search keyword within the first page.

4. The apparatus of claim 1, wherein the search unit, in a case where the search condition designation unit receives the designated page number search as the search condition, automatically searches the paginated document files containing the search keyword within the designated page by jumping to a top of the designated page within the plurality of pages of the target paginated document file.

5. The apparatus of claim 1, wherein the designated page is one of a single page, a plurality of pages separated by a mark, a search range, and a combination thereof.

6. The apparatus of claim 1, wherein the search condition is one of the full-text search, the designated page number search, and a last page search to target a last page of a paginated document file for search.

7. The apparatus of claim 1, further comprising:
a display unit configured to display a search result from a central processing unit.

8. The apparatus of claim 7, wherein the display unit displays, as the search result, a search result list having a search keyword hit count that reflects how many times the search keyword appeared in those pages searched in a paginated document file and document file names arranged next to a search keyword hit count and in ranked order of search keyword hit count.

9. The apparatus of claim 7, wherein the display unit displays, as the search result, a search result list in a form of reduced images after the search unit completes the search, wherein the reduced images include at least one icon.

10. The apparatus of claim 7, wherein, in response to the input unit not inputting a search keyword for use in searching paginated document files, the display unit displays all paginated document files in a list form, whereby a user can check a list of designated pages even if no keyword is input and can select a desired paginated document file from the list and perform predetermined processing that includes one of display, printing, or faxing of the paginated document file.

11. The apparatus of claim 10, wherein the display unit displays, using an icon, one of an image of a designated page or an image of a last page, wherein the search unit further is configured to determine whether the designated page exists in a target paginated document file and, in response to determining that the designated page does not exists in a target paginated document file, the display unit displays an image of a last page as an icon.

12. The apparatus according to claim 7, wherein the display unit displays a number of character strings, indicating the search keyword, found in a designated specific page of a searched paginated document file together with a search result.

13. A method for an apparatus having a document search function for searching paginated document files stored in a storage storing a plurality of paginated document files, the method comprising:
receiving a search condition from a user for use in searching paginated document files, wherein the search condition is one of a full-text search to target all pages of the paginated document files for search and a designated page number search to target a designated page of the paginated document files for search;
inputting a search keyword for use in searching the paginated document files;
searching for the search keyword within the paginated document files,
wherein, in response to receiving a designated page number search as the search condition, automatically, searching the paginated document files containing the search keyword within the designated page, and, in response to receiving the full-text search as the search condition, automatically searching the paginated document files containing the search keyword within any one of all pages.

14. The method of claim 13, further comprising:
determining whether the designated page exists in a target paginated document file and, in response to determining that the designated page does not exist in a first target paginated document file, searching the paginated document files containing the search keyword within one of the last page in the first target paginated document file and the first page in the first target paginated document file.

15. The method of claim 13, wherein the searching of the paginated document files containing the search keyword within the designated page in a target paginated document file includes jumping to a top of the designated page within the plurality of pages of the target paginated document file.

16. The method of claim 13, wherein the search condition is one of the full-text search, the designated page number search, and a last page search to target a last page of a paginated document file for search.

17. The method of claim 13, further comprising:
displaying a search result.

18. The method according to claim 17, wherein displaying includes displaying a list of identification information about a paginated document file found via a search of a specific page of the plurality of pages.

19. A memory storing a program that causes an apparatus to perform the method according to claim 13.

* * * * *